United States Patent [19]

Miller

[11] 4,141,963

[45] Feb. 27, 1979

[54] THERMAL DECOMPOSITION OF METAL NITRATES

[75] Inventor: Ralph Miller, Pleasantville, N.Y.

[73] Assignee: Ciba-Geigy Corporation, Ardsley, N.Y.

[21] Appl. No.: 797,279

[22] Filed: May 16, 1977

Related U.S. Application Data

[63] Continuation-in-part of Ser. No. 748,596, Dec. 8, 1976, Pat. No. 4,100,263.

[51] Int. Cl.² .............................................. C01G 45/02
[52] U.S. Cl. ................................... 423/592; 423/400; 423/605
[58] Field of Search ....... 423/605, 400, 592, 405 (U.S. only), 423/390 (U.S. only), 398 (U.S. only)

[56] References Cited

U.S. PATENT DOCUMENTS

| | | | |
|---|---|---|---|
| 2,374,674 | 5/1945 | Fox et al. | 423/605 |
| 2,714,550 | 8/1955 | Miller | 423/491 |
| 2,737,445 | 3/1956 | Nossen | 423/390 |
| 3,256,059 | 6/1966 | Biggs, Jr. | 423/DIG. 3 |
| 3,869,543 | 3/1975 | Schutte et al. | 423/390 |

*Primary Examiner*—O. R. Vertiz
*Assistant Examiner*—Thomas W. Roy
*Attorney, Agent, or Firm*—Harry Falber

[57] ABSTRACT

This invention relates to a process for the thermal decomposition of metal nitrates which decompose below a temperature of about 400° C. to form the corresponding metal oxide as well as oxides of nitrogen, said process involving distributing said nitrate over previously formed oxide and conducting said decomposition under "muffle" conditions such that said decomposition occurs in an atmosphere predominantly comprised of the vapors evolved during the thermal decomposition.

15 Claims, No Drawings

THERMAL DECOMPOSITION OF METAL NITRATES

RELATED APPLICATION

This application is a continuation-in-part of copending application Ser. No. 748,596, filed Dec. 8, 1976, now U.S. Pat. No. 4,100,263.

This invention is concerned with the thermal decomposition of metallic nitrates and more specifically with the thermal decomposition of metallic nitrates which decompose below a temperature of about 400° C. to form the corresponding oxide of the metal and oxides of nitrogen. This invention has special application to the thermal decomposition of nitrates which form an adherent scale on surfaces with which they are in contact while the decomposition is taking place. For example, it is known that when manganous nitrate is thermally decomposed while in contact with a heat transfer surface the resulting manganese dioxide forms a tenacious adherent scale.

Any method that will enable the metal nitrates to be efficiently thermally decomposed so that the decomposition can preferably be carried out (1) continuously, (2) in available equipment, (3) under conditions such that substantially all of the oxides of nitrogen formed are easily recovered or readily converted to concentrated nitric acid using known technology, (4) while enabling the solid oxide formed to be quantitatively recovered, will be eminently suited for economically decomposing metallic nitrates whose decomposition temperatures are below about 400° C.

Reference to Fox et al, Technical Paper 674 of the Bureau of Mines entitled SEMI-PILOT PLANT INVESTIGATIONS OF NITROGEN DIOXIDE PROCESS FOR BENEFICIATION OF MANGANESE ORES, reveals that a method for decomposing $Mn(NO_3)_2$ having the characteristics recited above was sought at least thirty years ago. Although this reference discloses the use of the oxides of nitrogen as a cyclic heat transfer medium, scale was observed to form on other parts of the equipment causing equipment breakdown. The method shown in this reference did not, therefore, meet the conditions recited above.

A further approach to the decomposition of manganous nitrate, is disclosed in Nossen, IND. & ENG. CHEM. Vol. 43, pages 1695–1700 (1951) and, as applied to other metallic nitrates, in his U.S. Pat. No. 2,737,445. Nossen's method, while suitable for a small-scale operation, has the disadvantage that all of the manganese dioxide is formed on a heat transfer surface and must be mechanically scraped from the surface. In addition, the $NO_2$ is formed in the presence of an excess of air or steam or both.

An improved method for carrying out the thermal decomposition of manganous nitrate is disclosed in U.S. Pat. No. 2,691,569. This process has the advantage that it is possible to avoid having the manganous nitrate touch and subsequently decompose on any of the heat transfer surfaces. It has the disadvantage, however, that the oxides of nitrogen are mixed with a substantial quantity of air. Hence, nitrogen dioxide as such cannot be recovered and a relatively elaborate nitric acid recovery unit is needed to insure against the loss of nitric acid values.

The basic reason for the difficulties encountered in trying to efficiently thermally decompose manganous nitrate and similar nitrates is summed up in Fraser, U.S. Pat. No. 3,667,700. Fraser attributes the difficulty to the physical properties of manganous nitrate solution and to their tendency to form sticky masses of low thermal conductivity. Fraser proposes to overcome the problem by heating above the decomposition temperature and by adequate agitation. However, the Fraser method allows the decomposing manganous nitrate to contact the heat transfer surface, thereby encountering the aforementioned difficulties.

Another method proposed in the past employed a fluidized bed of manganese dioxide in which heating coils or heating surfaces were immersed. An appreciable depth of bed was maintained above the upper heat transfer surface. Air was passed through the bed to keep it in a fluidized state. The manganous nitrate-containing solution was sprayed on to the top surface of the bed or within the bed at such a controlled rate that the decomposition took place on the particles composing the bed. None of the liquid was allowed to contact the heat transfer surface. The gas leaving the decomposition zone was composed of water vapor, nitric acid, some nitrogen dioxide and the large amount of air needed to keep the bed in an optimum condition of fluidization. Although this method prevents the fouling of the heat transfer surface, as previously noted, the presence of the fluidization air dilutes the gaseous decomposition products thereby complicating and increasing the expenses of the complete recovery of the oxides of nitrogen. Moreover, because the nitrogen dioxide is diluted with air it becomes excessively costly to recover it as concentrated nitric acid, i.e. acid whose concentration is close to that of the nitric acid-water azeotrope.

It is, therefore, the primary object of this invention to provide a technique for the thermal decomposition of metal nitrates to the corresponding metal and nitrogen oxides, whereby the resulting nitrogen dioxide can be recovered or economically converted to concentrated nitric acid.

It is a further object of this invention to accomplish the decomposition without encountering oxide coating on the heat transfer surfaces and without utilizing extraneous air or steam.

Various other objects and advantages of this invention will be apparent from the following description thereof.

It has been determined that by conducting the thermal decomposition under "muffle" conditions, it is possible to meet the criteria, as set forth hereinabove, for an improved nitrate decomposition process. Such "muffle" conditions are defined for purposes of this disclosure as an environment in which the gaseous atmosphere is predominantly that formed by the vapors evolved during the thermal decomposition. The improved methods are distinguished by making it possible to recover the bulk of the nitrogen dioxide evolved as such or to readily convert the nitrogen dioxide to utilizable nitric acid while simultaneously forming the bulk of the metal oxide on the surface of solid particles of said metal oxide. These improved methods rely either on using the formed metal oxide as the heat transfer medium with or without recycle of the exiting gases or on recycling a part of the exiting gas stream comprising water, nitric acid and oxides of nitrogen to the decomposition reactor as the heat transfer medium when the reactor is either a fluidized bed of the metal oxide or of the type of a rotary kiln. In each instance, the liquid phase containing the nitrate to be decomposed is necessarily spread over the surface of particles of said metal oxide prior to the actual occurrence of the decomposition.

The decomposition process of this invention proceeds according to the equation (utilizing manganous nitrate)

$$Mn(NO_3)_2 \rightarrow MnO_2 + 2 NO_2$$

whereby nitric acid can be readily and economically produced according to the overall equation $$2 NO_2 + H_2O + \tfrac{1}{2} O_2 \rightarrow 2 HNO_3$$

Practically all metallic nitrates are quite soluble in water or mixtures of water and nitric acid at ambient conditions and their solubility increases at elevated temperatures. Frequently, the solid nitrates which come out of solution at ambient temperature contain several mols of water of crystallization. When these crystals are heated, they frequently dissolve in the water of crystallization. The nitrates with which this invention are concerned melt at the temperature at which they decompose or are associated with enough water to form a concentrated aqueous solution under the conditions prevailing during the decomposition. In essence, the decomposition takes place while the decomposing substance is in the liquid phase. This may be the reason why an adherent oxide scale results when the nitrate decomposes while in contact with a heat transfer surface.

It is generally desired for purposes of this invention that the decomposition temperature of the applicable nitrates not be substantially above about 400° C. Such nitrates are chosen for economic considerations and due to the preference for employing the metal oxide as the heat transfer medium. Thus, in order to heat a metallic oxide to an elevated temperature under muffle conditions economically it is necessary to have a substantial temperature difference between hot products of combustion and the maximum temperature to which the oxide is heated. Otherwise, an excessive amount of heat transfer surface is required. The sensible heat transferred by a pound of the oxide is the product of the difference in temperature between the maximum temperature to which the oxide is heated and the temperature at which the decomposition is carried out multiplied by the specific heat of the oxide. The specific heat of metallic oxides is quite small in the range of 0.17 to 0.25. Therefore, it is desirable to have a difference in temperature of 200° C. to 300° C. or more between the decomposition temperature and the maximum temperature to which the oxide is heated in order to enable the necessary quantity of heat to be transferred while circulating a reasonable amount of oxide per pound of oxide formed in the decomposition.

For example, when a nitrate is decomposed at 400° C., the recycled oxide will have a temperature of about 400° C. As pointed out above, it is necessary to have some reasonable temperature difference between the products of combustion and the temperature to which the oxide is heated. If the temperature of the oxide is increased to about 600° C., then the products of combustion should be at about 800° C. This is a readily attainable temperature but circulating solids in a "closed" loop at temperatures much in excess of 600° C. invites problems with materials of construction, seals, lubricants, and the like. Accordingly, the invention is particularly applicable to nitrates whose decomposition is not appreciably higher than about 400° C.

The metal nitrates to be composed in accordance with the instant process may contain such metals as aluminum, cadmium, cerium, cobalt, manganese, iron, nickel, uranium, zinc, and the like. For purposes of the following descriptive material, reference will be made to the decomposition of manganous nitrate. It should be noted, however, that the described general procedures are equally applicable to the other metal nitrates utilizing their respective decomposition temperatures as noted in the technical literature. In addition, reference will be made to a nitrate solution, although the procedures are equally applicable to nitrate in a liquid phase, as defined hereinabove.

In general, the procedure involves introducing solid manganese dioxide particles into a decomposition reactor; heating the particles above the decomposition temperature; charging an aqueous nitrate solution, with or without added manganese dioxide particles, onto the particles so as to coat them with solution; maintaining the coated particles, in the substantial absence of air, at the elevated temperature for a period of time sufficient to decompose the nitrate with the manganese dioxide decomposition product forming on the manganese dioxide particles; and withdrawing the products of decomposition. In those instances where a gaseous stream functions as the heat transfer medium, the gaseous stream is introduced into the reactor simultaneously with the heating of the manganese dioxide particles. The gaseous stream is similar in composition to the nitrogen dioxide-containing gaseous mixture resulting from the decomposition procedure and is substantially devoid of non-condensible gases. In general, the manganese dioxide particles and the nitrogen dioxide-containing gaseous mixture will comprise recycled decomposition products.

More specifically, the preferred approach begins with preparation of the feed material by thoroughly mixing the initial aqueous manganous nitrate solution with manganese dioxide particles. As noted hereinabove, such particles will generally comprise recycled decomposition product. The mixing is carried out in any convenient manner, but preferably continuously. A preferred mixing method is one which employs equipment so designed and operated that the required substantial amount of mechanical energy is put into the mixing operation without overstressing the components of the equipment. Two such mixers are a continuous Marion mixer and a continuous muller.

The basic purpose of the mixing operation is to coat the manganese dioxide particles with the manganous nitrate solution in order to form a moist solid mass. Although not essential, it is economically desirable that the manganous nitrate-liquid phase contain 50% or more, by weight, manganous nitrate. This nitrate concentration of greater than about 50% applies equally to other nitrates. The larger the manganous nitrate content, the smaller will be the ratio of weight of solid recycle manganese dioxide to weight of initial manganous nitrate-containing mixture in the final blend, which blend is the feed to the next step of the process. It is desirable to have the blend contain three or more parts, by weight, of solid, manganese dioxide recycle for each part of liquid, i.e., water or water plus nitric acid in the initial mixture. Even when an unnecessarily large ratio of recycle manganese dioxide to manganous nitrate containing mixture is employed, the economic penalty is small.

The temperature of the blend is then raised above the manganous nitrate decomposition temperature. Although the decomposition will initiate below a temperature of about 170°-180° C., it will generally take place slowly at that level.

One method of heating the blend above a temperature of about 180° C. is to bring it into intimate contact with a relatively large amount of powdered, solid, hot, manganese dioxide, the temperature of which is usually close to 500° C. The weight ratio of hot manganese dioxide, whose initial temperature is about 500° C., to the blend should be selected so that the final temperature of the resulting mixture will be at least around 190° C.

The heat required to raise the temperature of the blend to 190° C. will vary with its composition and initial temperature. The heat supplied by the hot $MnO_2$ must be sufficient to vaporize the water in the blend and to raise the temperature of the water vapor to 190° C., vaporize any nitric acid in the blend and bring the temperature of the nitric acid vapor to about 190° C.; heat the $Mn(NO_3)_2$ to its decomposition temperature; supply the heat of decomposition; and provide enough heat so that the temperature of the $MnO_2$ and $NO_2$ formed in the decomposition also reach a temperature of about 190° C.

The temperature of hot $MnO_2$ used to supply heat to the decomposition is rarely in excess of about 525° C. because $MnO_2$ starts to dissociate to MnO and oxygen at a temperature of about 535° C. This reaction absorbs heat. Any heat supplied that causes any of the $MnO_2$ to dissociate is substantially lost. Moreover, any MnO added to a nitric acid-containing solution will form $Mn(NO_3)_2$. Heat will then have to be supplied to decompose the newly formed $Mn(NO_3)_2$.

Available thermodynamic data, as contained in the Report of Investigation 3776 (1944) of the Bureau of Mines, makes it possible to closely approximate the quantity of heat that must be supplied to any given manganous nitrate-containing mixture so that the manganous nitrate is decomposed to $MnO_2$ and $NO_2$, the water and nitric acid originally in the mixture is vaporized and the temperature of the resultant vapor is brought to that of the residual $MnO_2$. To minimize the heat requirements of this step, it is desirable to minimize the amount of water and nitric acid in the blend without concentrating the manganous nitrate-containing mixture beyond the level at which the cost of further concentration exceeds the benefit derived therefrom. Manganous nitrate is very soluble in hot water- and hot nitric acid-containing solutions. Accordingly, there is little difficulty in preparing mixtures whose $Mn(NO_3)_2$ content exceeds 60%, by weight. Since an evaporation step usually precedes the thermal decomposition, the mixture charged to the thermal decomposition is usually close to its boiling point which, in most instances, will be in the neighborhood of 140° C.

Substantially quantitative recovery of the $MnO_2$ charged to the decomposition of the $MnO_2$ formed in the decomposition and of the vapor resulting from the decomposition can be achieved by mixing the manganous nitrate-containing blend with the hot manganese dioxide and effecting the decomposition under substantially "muffle" conditions. As previously noted, "muffle" conditions indicate an environment in which the gaseous atmosphere is predominately that formed by the vapors evolved during the thermal decomposition. The equipment generally employed is designed and operated to prevent the loss of oxides of nitrogen and to minimize, if not to exclude completely, the ingress of air. On the scale at which these decompositions are carried out, it becomes prohibitively expensive to exclude air completely. However, by operating as described below, only very small quantities of air leak into the system such that only small amounts of non-condensible gas mix with the vapors formed during the thermal decomposition. The percent of non-condensible gas, which is primarily nitrogen, in the vapor leaving the thermal decomposition step will generally be below about 5%, by weight.

The preferred method of carrying out the thermal decomposition reaction employs a rotary kiln fitted with appropriate seals at the inlet and discharge ends. By means of a blower, pressure controls, and dampers, the kiln is maintained under a very slight vacuum. In this way, air leakage into the system is negligible. The interior of the kiln is preferably equipped with lifting flights. The feed end is encased in a housing containing means by which the hot, manganese dioxide particles can be charged to the kiln and separate means for the controlled charging of the manganous nitrate-containing blend. A preferred arrangement is the equivalent of a double wall pipe with the manganous nitrate-containing blend flowing through the inside pipe and the hot manganese dioxide flowing through the outer annulus. The outer pipe extends beyond the entrance end of the kiln so that the hot manganese dioxide drops from the annulus into the kiln at a location close to the kiln's feed end. The inner pipe of the double wall pipe extends further into the kiln so that the manganous nitrate-containing blend enters the kiln closer to the kiln's discharge end. By means of this arrangement, the manganous nitrate-containing blend falling into the kiln drops onto a previously formed moving bed of hot manganese dioxide particles. In this way, little or no manganous nitrate contacts the kiln's inner surface.

As the charge to the kiln moves from the feed end to the discharge end, the two feed streams become thoroughly mixed. The mixing that takes place results from the action of the flights as the kiln rotates combined with the gaseous bubbling taking place within the bed as liquid evaporates and $NO_2$ is formed. The residence time in the kiln is controlled by the kiln's dimensions, the feed rate, the speed of rotation, its inclination, the arrangement of the flights and the bed depth.

The discharge end of the kiln is generally fitted with a housing equipped with means for separating any finely divided manganese dioxide particles that tend to stay suspended in the exiting gas. Substantially solids-free vapor is taken out of a top opening in the discharge housing which opening is connected to a conduit leading to means for recovering the water, nitric acid and oxides of nitrogen values.

A circulating stream of solid manganese dioxide particles is thus established. The hot particles leaving the outlet end of the kiln are divided into two fractions. One fraction is conveyed by means of a screw conveyor or equivalent to a liquid-solids mixer which also functions as the feed hopper of the kiln. A solution of manganous nitrate or a slurry composed of solid nitrate suspended in a solution of nitrate is introduced into the solids-liquid mixer by means of inlet nozzles. The discharge from the mixer is a bed of wet particles. These wet particles, which preferably contain about 10% to 25%, by weight, of liquid phase, are then fed to the kiln.

The other fraction is charged to heating means in which its temperature is raised close to about 500° C., preferably under essentially muffle conditions. One method for raising the temperature of the manganese dioxide particles is to charge them to a second rotary kiln made of steel or steel alloy, the greater length of which is housed within a furnace. Hot products of combustion heat the outer surface of the kiln. The heat passes through the kiln wall and raises the temperature of the manganese dioxide particles to the desired level as they move from the feed end of the kiln to its discharge end. By using this method of heating the manganese dioxide, the problems which generally arise when finely divided solids are heated by direct contact with hot products of combustion are avoided. From this description, it is now evident that a part of the manganese dioxide is used as a heat transfer medium and part is used to provide an extended surface on which the bulk of the manganous nitrate is decomposed. The net product of the decomposition is thus withdrawn from the process with the amount withdrawn being equivalent to the quantity of manganous nitrate charged to the initial blending step.

Where the manganese dioxide is not utilized as the heat transfer medium but, rather the exiting gases are, a circulating stream of nitric acid vapor, water vapor and oxides of nitrogen can be established which passes out of the discharge end of the kiln, to the inlet side of a blower, out the blower through a heat exchanger and into the inlet end of the kiln. The gas entering the heat exchanger is kept within a temperature range of about 210° to 250° C. The outlet temperature of the gas is usually maintained in the temperature range of 400° C. to 500° C. The gas is preferably heated in a gas to gas heat exchanger using products of combustion as the heating medium.

As the operation proceeds the amount of manganese dioxide in the circulating stream builds up. Solid manganese dioxide is withdrawn from the circulating stream periodically or continuously. The amount withdrawn is equivalent to the amount of manganese dioxide formed from the manganous nitrate fed to the decomposition operation. To prevent the loss of $NO_2$ and nitric acid, enough vapor is withdrawn from the circulating vapor stream so that the gaseous pressure within the system is maintained, as related above, just below the atmospheric pressure.

In either instance, the portion of gas leaving the decomposition reactor which is not recycled is cooled to a temperature of about 35° to 45° C., by means of available cooling water. The resulting mixture of liquid nitric acid plus gaseous $NO_2$ can be processed in several ways. One procedure is to feed the mixture of gas and liquid to a liquid ring compressor such as the well known Nash Compressor. The mixture is compressed to a pressure which is varied depending upon the temperature of the available cooling water. The boiling point of $NO_2$ at atmospheric pressure is 21° C. The mixture is compressed so that on cooling, using available cooling water, the $NO_2$ is condensed to the liquid state. In this way substantially all of the gaseous mixture leaving the decomposition zone, except that portion which is recycled to the decomposition zone, is condensed to a liquid. The liquid, composed of a mixture of aqueous nitric acid and liquid $NO_2$, is thereafter pumped into a reaction zone at superatmospheric pressure along with oxygen. Cooling means and gas-liquid contacting means are provided within the reaction zone. Under these conditions, the $NO_2$ is converted to nitric acid by means of the above noted reaction. This known technique of converting the $NO_2$ to nitric acid is feasible because the $NO_2$ is able to be pumped into the reaction zone in the substantial absence of any non-reactive, non-condensible gas such as nitrogen.

Similarly, the known process of converting $NO_2$, as liquid or gas, to concentrated nitric acid using air under superatmospheric pressure can also be applied.

A more compact installation than that described above can also be used to carry out the invention. This type of installation employs a multiple hearth muffle furnace. A multiple hearth muffle furnace installation has certain advantages when the invention is carried out on a relatively small scale. For example, when a multiple hearth muffle furnace having sixteen hearths is used to practice the invention manganese dioxide particles at a temperature below 170° C. are fed to the periphery of the top hearth through a top feed opening. Rabble arms equipped with blades set at an appropriate angle move the particles from the periphery to a center opening through which they fall to the hearth below. Blades attached to rabble arms connected to the central shaft move the particles falling on the second hearth to its periphery in which there are openings at selected locations through which the particles drop on to the third hearth, etc.

A manganous nitrate solution is dribbled on to the rabbled bed of manganese dioxide particles on the top three hearths using a weight ratio of solution to $MnO_2$ that the moist particles have little tendency to ball up or agglomerate and are readily moved across the hearths.

Manganese dioxide particles at a temperature of 500° C. are charged to the fourth hearth close to its periphery. Mixing of the two feed streams take place as a result of rabbling, gas evolution and the movement of the mixture back and forth across the hearths. Sufficient hot $MnO_2$ in relation to the solution is used and the operation is so conducted that all of the manganous nitrate is decomposed by the time the particles drop from the eighth hearth. The manganese dioxide leaving the eighth hearth is divided into two fractions by means of an overflow arrangement. One fraction drops into a duct leading to a vertical pipe containing a screw conveyor. The screw conveyor elevates the manganese dioxide particles so that they overflow into a second pipe connected to the furnace's top feed opening. The manganese dioxide particles are cooled below 170° C. in passing through this part of the equipment. The amount of $MnO_2$ circulated through this flow path is controlled by the speed of rotation of the screw conveyor. The fraction of manganous dioxide leaving the eighth hearth which cannot be accommodated by the screw conveyor falls to hearth 9.

Hearths 9 through 16 are equipped with top silicon carbide muffles in each of which fuel is burned. The hot silicon carbide muffles radiate heat to the $MnO_2$ which is moved back and forth across the hearths raising the temperature of the $MnO_2$ close to 500° C. by the time it drops off the sixteenth hearth into a bottom furnace discharge chute. The chute is connected to an insulated vertical screw conveyor running up the outside of the furnace. The hot $MnO_2$ is elevated by the screw conveyor and is discharged to a pipe leading to an opening in the furnace above the fourth hearth level so that the hot $MnO_2$ drops onto the periphery of the fourth hearth. A portion of this stream is withdrawn as product. The amount withdrawn is equivalent to the quantity of manganous nitrate charged to the decomposition.

The furnace also has a top opening through which the water vapor, nitric acid vapor and oxides of nitrogen resulting from the decomposition flow to means for recovering the nitric acid and oxides of nitrogen values. The equipment is designed and operated to prevent acid losses and minimize inward air leakage.

By carrying out the decomposition under muffle conditions rather than in the presence of excess air or stream the recovery of the nitric acid and nitrogen oxide values is materially simplified by using the following scheme: Thus, as previously noted, the hot vapor from the decomposition, containing little or no air, is cooled in one or more heat exchangers. The bulk of the water and nitric acid condense to a nitric acid solution when the temperature of the vapor falls below about 50° C. The remaining vapor is cooled below 21° C. This condenses most of the $NO_2$ remaining in the vapor. The remaining cooled, uncondensed gas composed mostly of nitrogen oxide is compressed to a pressure of 6 to 12 bars and fed to a typical nitric acid absorption tower along with compressed air and water. The nitrogen oxide is recovered as nitric acid.

If there is no need for the $NO_2$, it can also be fed to the nitric acid tower. In some instances, it is advantageous to feed the aqueous nitric acid condensate to the nitric acid absorption tower, thereby recovering concentrated nitric acid for reuse.

A further approach may utilize a fluidized bed reactor. The fluidized bed reactor is composed of a fluidized bed of solid manganese dioxide particles in which an extended area of heat transfer surface is immersed. When the bed is in an expanded condition, a substantial depth of bed ranging from about 30% to 60% of the total bed depth is maintained above the top of the heat transfer surface. A heat transfer fluid such as hot oil, molten salt or high-temperature vapor is circulated through the inner passages of the heat transfer surface. The heat transfer agent entering the heating equipment is preferably at a temperature in excess of 350° C. so that the required area of expensive heat transfer surface is minimized. The feed to the manganous nitrate decomposition reactor is sprayed on the top surface of the fluidized bed or into the bed at a location sufficiently distant from any heat transfer surface so that none of the liquid can reach any of the heat transfer surface. The solution is fed to the fluidized bed at such a rate that the particles within the bed are maintained at a temperature not less than about 200° C. When the solution contacts the bed, the water and nitric acid are vaporized and the $Mn(NO_3)_2$ decomposes to solid $MnO_2$ and gaseous $NO_2$. The $MnO_2$ tends to adhere to the particles forming the bed and causes them to increase in size. In order to maintain good fluidization, means are provided to take particles out of the bed and classify them. The smaller particles are returned to the bed and, if necessary, some of the larger particles taken out of the bed may be milled and the ground particles returned to the bed.

The vapor leaving the bed consisting of water, nitric acid and oxides of nitrogen flows to the inlet of a blower. The pressure increase obtained by the action of the blower is used to recycle a part of the gas stream back through gas dispersion means located at the bottom of the fluid bed, through the bed and then back to the blower. The flow of gas through the dispersed bed is kept at the optimum velocity to maintain the bed in a stable fluidized condition. This scheme provides constant fluidizing conditions as long as a predetermined maximum manganous nitrate feed rate to the bed is not exceeded. The composition and rate of the feed can vary within large limits without causing operational difficulties providing that the feed rate is below the allowable maximum. When the temperature of the heat transfer medium is about 350° C., about 5400 Btu per hour is transferred to the bed per square foot of immersed heat transfer area. Another attribute of this method is that changes in the feed rate will not affect the recovery and conversion of the $NO_2$ to nitric acid. This advantage is gained because, unlike prior methods of fluidizing the bed, the gas used to fluidize the bed is free from non-condensible, non-reactive gases such as nitrogen.

The flexibility of the fluidized bed approach can be seen in that it accommodates a variety of mechanisms. Thus, (1) an extraneous heat transfer surface can be combined with gas recycle fluidization; (2) an extraneous heat transfer surface can be combined with gas recycle serving both fluidization and heat transfer functions; (3) the gas recycle can be used as in alternative (2) without the presence of the extraneous heat transer surface; and (4) alternatives (1) - (3) can be utilized in conjunction with a feed system which comprises a moist solid of nitrate solution and manganese dioxide withdrawn from the bed. In addition, the moist solids feed system of alternative (4) can be added to the bed in conjunction with hot manganese dioxide which has been heated to a temperature of from about 500° - 525° C. under muffle conditions.

As previously noted, these described procedures are equally applicable to a number of metal nitrates utilizing their respective decomposition temperatures. In addition, the nitrate decomposition may form part of an overall process whereby decomposition of a nitrate solution is a desired step. For example, the cyanogen chloride process described in U.S. application Ser. No. 748,596, filed Dec. 8, 1976, has as an end product, an acidic manganous nitrate solution which can be readily decomposed according to the procedures of the instant invention.

Summarizing, it is seen that this invention provides an improved process for the thermal decomposition of metal nitrates. Variations may be made in proportions, procedures and materials without departing from the scope of the invention as defined by the following claims.

What is claimed is:

1. A method for thermally decomposing a metal nitrate in a liquid phase to the corresponding metal oxide and a nitrogen dioxide-containing gaseous mixture, said metal nitrate having a decomposition temperature of less than about 400° C., said process comprising the steps of
    (1) introducing solid metal oxide particles coated with said metal nitrate liquid phase into a decomposition reactor, the metal of said oxide corresponding to the metal in the liquid phase;
    (2) raising the temperature of said coated particles above the decomposition temperature of said nitrate;
    (3) maintaining said coated patricles at a temperature above said decomposition temperature and in an atmosphere formed by the vapors evolved during said decomposition for a period of time sufficient to decompose said nitrate, the metal oxide decomposition product forming on and adhering to said particles; and (4) removing said metal oxide and said nitrogen dioxide-containing gaseous mixture.

2. The method of claim 1, wherein said liquid phase of metal nitrate contains at least about 50%, by weight, of nitrate.

3. The method of claim 1, wherein the weight ratio of solids to liquid phase in said coated particles is at least about 3:1.

4. The method of claim 1, wherein said decomposition reactor is a fluidized bed of said oxide particles and at least a portion of said gaseous mixture is recycled to the decomposition reactor and comprises the fluidizing means.

5. The method of claim 1, wherein said decomposition reactor is a fluidized bed of said coated metal oxide particles, a portion of said nitrogen dioxide-containing gaseous mixture is the fluidizing means and the temperature of the particles in said bed is maintained above said decomposition temperature by immersing in said bed an extended area of heat transfer surface containing inner passages through which a heat transfer fluid is circulated at a temperature in excess of said decomposition temperature.

6. A method for thermally decomposing manganous nitrate contained in a liquid phase to manganese dioxide and a nitrogen dioxide-containing gaseous mixture which comprises the steps of (1) introducing solid manganese dioxide particles coated with said manganous nitrate liquid phase into a decomposition reactor;

(2) raising the temperature of said coated particles above about 180° C.;

(3) maintaining said coated particles at said temperature in excess of about 180° C., and in an atmosphere formed by the vapors evolved during said decomposition for a period of time sufficient to decompose said manganous nitrate, the manganese dioxide decomposition product forming on and adhering to said manganese dioxide particles, and (4) removing manganese dioxide and said nitrogen dioxide-containing gaseous mixture.

7. The method of claim 6, wherein said liquid phase of manganous nitrate contains at least about 50%, by weight, of nitrate.

8. The method of claim 6, wherein the weight ratio of solids to liquid phase in said coated particles is at least about 3:1.

9. The method of claim 6, wherein said decomposition reactor is a fluidized bed of said dioxide particles and at least a portion of said nitrogen dioxide-containing gaseous mixture of step (4) is recycled to the bed as the fluidizing means.

10. The method of claim 6, wherein the temperature of said coated particles is raised above about 180° C. by contacting said coated particles with manganese dioxide particles whose temperature is above the decomposition temperature of manganous nitrate.

11. The method of claim 10, wherein said liquid phase of manganous nitrate contains at least about 50%, by weight, of nitrate.

12. The method of claim 10, wherein the weight ratio of solids to liquid phase in said coated particles is at least about 3:1.

13. The method of claim 10, wherein at least a portion of the manganese dioxide removed in step (4) is heated and recycled to contact said coated particles and raise the temperature thereof.

14. The method of claim 10, wherein said decomposition reactor is a rotary kiln.

15. The method of claim 10, wherein said decomposition reactor is a fluidized bed of said dioxide particles and at least a portion of said nitrogen dioxide-containing gaseous mixture of step (4) is recycled to the bed as the fluidizing means.

* * * * *